US012302073B2

(12) United States Patent
McKee et al.

(10) Patent No.: US 12,302,073 B2
(45) Date of Patent: May 13, 2025

(54) NON-INTRUSIVE TRANSDUCER HEALTH DETECTION

(71) Applicant: Dolby Laboratories Licensing Corporation, San Francisco, CA (US)

(72) Inventors: Joseph McKee, Wollstonecraft (AU); Timothy Alan Port, Drummoyne (AU); Paul Holmberg, North Ryde (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 205 days.

(21) Appl. No.: 18/000,835

(22) PCT Filed: Jun. 21, 2021

(86) PCT No.: PCT/US2021/038187

§ 371 (c)(1),
(2) Date: Dec. 6, 2022

(87) PCT Pub. No.: WO2021/258037

PCT Pub. Date: Dec. 23, 2021

(65) Prior Publication Data

US 2023/0232174 A1 Jul. 20, 2023

Related U.S. Application Data

(60) Provisional application No. 63/041,685, filed on Jun. 19, 2020.

(30) Foreign Application Priority Data

Jun. 19, 2020 (EP) .................................... 20181112

(51) Int. Cl.
*H04R 29/00* (2006.01)

(52) U.S. Cl.
CPC ......... *H04R 29/001* (2013.01); *H04R 29/004* (2013.01)

(58) Field of Classification Search
CPC .. H04R 29/001; H04R 29/002; H04R 29/004; H04R 29/005
See application file for complete search history.

(56) References Cited

U.S. PATENT DOCUMENTS

2007/0112563 A1* 5/2007 Krantz ..................... H04R 5/02 704/216
2015/0163616 A1 6/2015 Chatterjee
(Continued)

FOREIGN PATENT DOCUMENTS

DE 19640825 C2 7/1998
JP 05328499 A1 12/1993
(Continued)

OTHER PUBLICATIONS

Foley et. al., Higher Order Harmonic Signature Analysis for Loudspeaker Defect Detection, Audio Engineering Society Convention 117. Audio Engineering Society, 2004.
(Continued)

*Primary Examiner* — Jason R Kurr

(57) ABSTRACT

Embodiments are disclosed for non-intrusive transducer health detection in an audio system. In an embodiment, a method performed by the audio system comprises outputting one or more encoded inaudible acoustic signals into an acoustic transmission medium using a first transducer. The one or more encoded inaudible acoustic signals are received from the acoustic transmission medium using a second transducer of the audio system. The received one or more encoded inaudible acoustic signals are used to identify failure or degradation of the first or second transducer.

12 Claims, 4 Drawing Sheets

(56) References Cited

U.S. PATENT DOCUMENTS

| | | | | |
|---|---|---|---|---|
| 2015/0332584 | A1 | 11/2015 | Tenkama | |
| 2015/0382121 | A1* | 12/2015 | Family | H04R 29/002 381/59 |
| 2018/0027348 | A1* | 1/2018 | Aniya | H04R 29/002 381/58 |
| 2018/0343531 | A1* | 11/2018 | Nomoto | H04R 29/00 |
| 2020/0213792 | A1* | 7/2020 | Nathadi | G06F 3/165 |

FOREIGN PATENT DOCUMENTS

| | | | |
|---|---|---|---|
| WO | 1997018648 | A1 | 5/1997 |
| WO | 2013153484 | A1 | 10/2013 |
| WO | 2016090342 | A2 | 6/2016 |

OTHER PUBLICATIONS

Galway et. al., Loudspeaker defect analysis using ultrasonic harmonic characterization J Acoust Soc Am 119, 3272 (2006).

Rub & Buzz and High Order Harmonic Analysis Tutorial, National Instruments White Papers, Sep. 27, 2011.

* cited by examiner

NON-INTRUSIVE TRANSDUCER HEALTH DETECTION

CROSS-REFERENCE TO RELATED APPLICATIONS

This application claims priority of U.S. Provisional Patent Application No. 63/041,685, filed Jun. 19, 2020, and European Patent Application No. 20181112.2, filed Jun. 19, 2020, both of which are incorporated herein by reference in their entirety.

TECHNICAL FIELD

This disclosure relates generally to detecting failed transducers (e.g., speakers, microphones) in an audio system.

BACKGROUND

Audio systems often include multiple sound transducers, such as loudspeakers and microphones. In many audio applications it is difficult for a user of the audio system to determine whether there is a problem with a transducer in the audio system. In television applications, an audible test tone is played to test the speaker. This test tone, however, is disruptive to the user, and in the case of a managed device, not the user's responsibility. In cinema applications, detecting a broken speaker or microphone is expensive since it requires the audio system to be taken out of service for inspection and repairs. In video conferencing applications that use beamforming or location mapping, if one microphone becomes more degraded than the other microphone, the beamformer will point in the wrong direction, which is difficult to detect by a user. While built-in open and short circuit detection technology is often used in conventional audio systems, such detection technology is unable to detect different types of acoustic degradation.

SUMMARY

The present invention relates generally to non-intrusive transducer health detection in an audio system. A first aspect of the invention relates to a method performed by an audio system, comprising encoding a test signal on an inaudible acoustic signal, outputting, using a first transducer of the audio system, the encoded inaudible acoustic signal into an acoustic transmission medium, receiving, using a second transducer of the audio system, the encoded inaudible acoustic signal from the acoustic transmission medium, recovering a recovered test signal from the received encoded inaudible acoustic signal, and using the recovered test signal to identify a failure or degradation of any one of the first and second transducer.

In an embodiment, the inaudible acoustic signal is encoded using a pseudo-random binary sequence. The pseudo-random binary sequence can be a maximum length sequence.

In an embodiment, the recovered test signal is related to (e.g. compared to) the (known) test signal to identify a failure or degradation.

In an embodiment, an impulse response of the audio system is determined based on a relationship between the recovered test signal and the test signal. Further, a change in a signal-to-noise ratio (SNR) of the impulse response may be used to identify the failure or degradation of at least one of the first or second transducer.

In an embodiment, in accordance with identifying the failure or degradation of at least one of the first or second transducer, the audio system initiates at least one of disabling the at least one transducer, adjusting input/output signal processing of the at least one transducer or initiating one or more additional diagnostic tests on the at least one transducer.

In an embodiment, the audio system includes a first plurality of transducers and a second plurality of transducers, and outputs, using the first plurality of transducers of the audio system, a plurality of encoded inaudible acoustic signals into an acoustic transmission medium, each inaudible acoustic signal having a different encoding. The audio system receives, using the second plurality of transducers of the audio system, the plurality of encoded inaudible acoustic signals from the acoustic transmission medium. The audio system uses the received plurality of encoded inaudible acoustic signals to identify a failure or degradation of at least one transducer of the first or second plurality of transducers. The plurality of encoded inaudible acoustic signals are output to the acoustic transmission medium in parallel or one at a time.

In an embodiment, using the received plurality of encoded inaudible acoustic signals to identify the failure or degradation of at least one transducer of the first or second plurality of transducers includes measuring impulse responses of the audio system for first and second transducer pairs and identifying the failure or degradation using the impulse responses.

In an embodiment, using the received plurality of encoded inaudible acoustic signals to identify the failure or degradation of at least one of the first or second plurality of transducers includes determining signal-to-noise ratios of the impulse responses, comparing the signal-to-noise ratios to determine outlier signal-to-noise ratios, and identifying the failure or degradation of at least one of the first or second transducer using the outlier signal-to-noise ratios.

In an embodiment, a statistic or metric is computed using the signal-to-noise ratios and each signal-to-noise ratio is compared with the mean, and the outlier signal-to-noise ratios are determined based on the comparison with the mean.

Other aspects of the invention disclosed herein are directed to a system, apparatus and computer-readable medium. The details of the disclosed implementations are set forth in the accompanying drawings and the description below. Other features, objects and advantages are apparent from the description, drawings and claims.

Particular embodiments disclosed herein provide one or more of the following advantages. Different types of acoustic degradation of transducers are automatically detected by an audio system without playing a disruptive audible test tone or without taking the audio system out of service for inspection and repairs.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

The same reference symbol used in various drawings indicates like elements.

DETAILED DESCRIPTION

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." In addition, in the following description and claims, unless defined otherwise, all technical and scientific terms used herein have the same meaning as commonly understood by one of ordinary skills in the art to which this disclosure belongs.

System Overview

Figure 1:
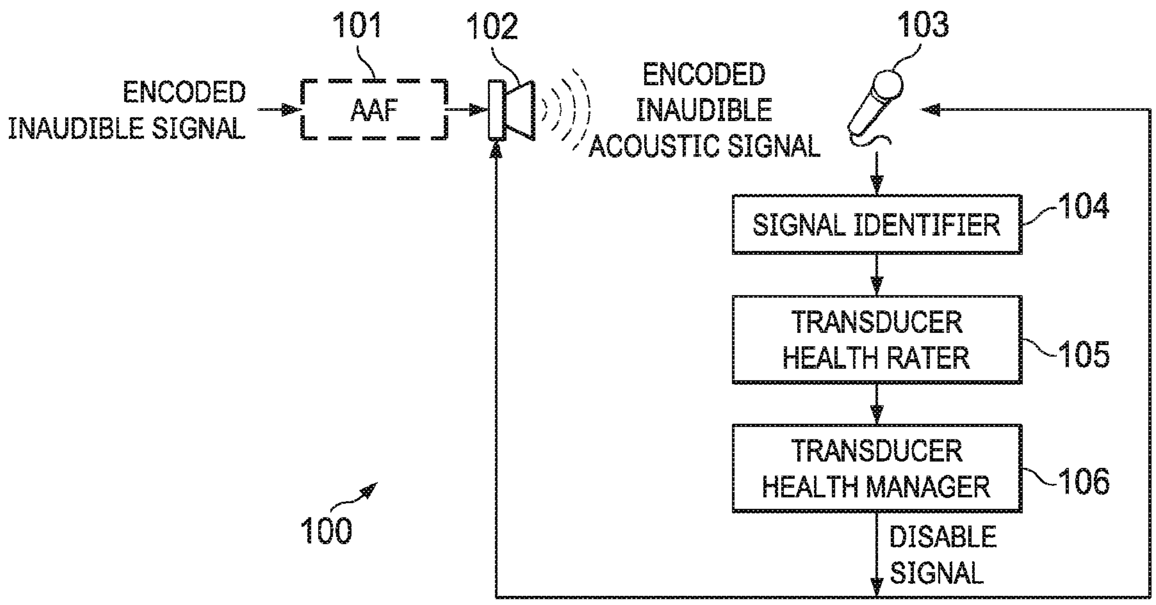
FIG. 1 is a block diagram of a non-intrusive transducer health detection system, according to an embodiment.

FIG. 1 is a block diagram of a non-intrusive transducer health detection system 100, according to an embodiment. System 100 includes optional anti-aliasing filter (AAF) 101, transducer 102, transducer 103, signal identifier 104, transducer health rater 105 and transducer manager 106. In this example embodiment, transducer 102 is a loudspeaker and transducer 103 is a microphone. System 100 can include any number of transducers and any type of transducer. System 100 can be implemented in an audio system to assist users, information technology departments and/or manufacturers to diagnose issues with audio signal chains. Some example audio systems include but are not limited to: teleconference endpoints, videoconference endpoints, cinema audio systems, smart speakers, televisions, home theatre systems, live concert mic/speaker/monitor set-ups and connected Internet-of-Things (IoT) devices.

In this embodiment, a test signal is encoded on an inaudible acoustic signal by a modulator circuit (not shown) which modulates the inaudible acoustic signal with the test signal (e.g., a pseudo-random binary sequence) and outputs the modulated inaudible signal through transducer 102 to the acoustic transmission medium. In an embodiment, the inaudible signal is an ultrasonic signal. In an embodiment, the inaudible signal is a signal in the range of human hearing but is inaudible due to its sound pressure level (SPL) level or due to psychoacoustic masking with other acoustic signals. In an embodiment, the inaudible signal is a subsonic signal. The "audibility" of a particular inaudible signal may be determined offline with an assumed background noise level, or online in the case of a multiple mic/speaker system by measuring the background noise level.

In an embodiment, the inaudible signal is encoded using any type of analog or digital modulation, including but not limited to: Amplitude Shift Key (ASK), Frequency Shift Key (FSK), Phase Shift Key (PSK), Quadrature Amplitude Modulation (QAM) and Binary Phase Shift Keying (BPSK). In an embodiment, a modulated signal drives a loudspeaker which outputs the encoded inaudible acoustic signal to the acoustic transmission medium. In an embodiment, a mixer combines the inaudible signal with another signal (e.g., an audio signal), producing an acoustic signal that is output through the loudspeaker to the acoustic transmission medium.

In an embodiment where the inaudible signal is an ultrasonic signal, the inaudible transducer is a piezoelectric transducer or capacitive transducer, and the ultrasonic signal has a frequency above the audible frequency range of humans (e.g., >20 kHz). In an embodiment, the test signal that encodes/modulates the inaudible signal is a maximum length sequence (MLS) generated using maximal linear feedback shift registers. The MLS helps prevent false positives from other inaudible signals (e.g., false positives from singing capacitors). Each inaudible signal can be encoded/modulated with a different MLS and/or encode/modulate a different carrier signal having a different carrier frequency.

In an embodiment, the inaudible signal is processed by AAF 101, such as a low-pass filter, before being played through transducer 102 (e.g., a loudspeaker) into the acoustic transmission medium.

Transducer 103 (e.g., a microphone) receives or captures the inaudible acoustic signal (hereinafter also referred to as the "received signal") from the environment and outputs the received signal to signal identifier 104. Signal identifier 104 processes the received signal to recover a recovered test signal (a recovered version of the test signal). A failure or degradation of any one of the transducers 102, 103 may now be determined based on a relationship between the recovered test signal and the test signal. For example, if a MLS is used as the test signal, the total impulse response of the transducers (impulse responses of transducers 102, 103 plus the impulse response of the channel ("room") is determined using circular cross-correlation on the recovered MLS (recovered test signal) and the original MLS (test signal). The signal-to-noise ratio (SNR) of the impulse response is computed and input to transducer health rater 105. In some cases, an inaudible acoustic signal may not be identified by signal identifier 104, indicating transducer failure. In such a case, a corrective action (e.g., disable the transducer) is initiated by transducer health manager 106 without further analysis.

In one embodiment, the transducer health rater 105 determines the health of the transducers 102, 103 by comparing the SNR of the impulse response computed by signal identifier 104 to one or more threshold values. For example, if the SNR is lower than a specified threshold value, transducer 102 or transducer 103 is assumed to be degraded. In an embodiment, if the impulse response of the channel (also referred to as the "room impulse response") is known then it can be used to determine the threshold values to avoid false positives. For example, the room may attenuate the received signal even if the transducers are not degraded. In an embodiment, the impulse response is gated to remove room reflections that can impact the impulse response and frequency response of the loudspeaker/microphone pair being tested.

Transducer health rater 105 outputs health ratings for transducers 102, 103 to transducer health manager 106. Transducer health manager 106 initiates one or more actions in response to the health ratings, such as initiating the disabling of one or both transducers 102, 103, changing the signal path or adjusting the processing of the audio signal (e.g., adjusting rendering of multichannel audio), and/or initiating further diagnostic tests of transducers 102, 103 (e.g., a sweep sine test, manual test steps). In an embodiment, the characteristics of transducers 102, 103 are measured over time to determine the slow degradation of transducers 102, 103, so that the audio system can be scheduled for servicing.

In an embodiment, various characteristics of the impulse response (e.g., peak amplitude rise time, settling time) in the time domain or the frequency response can be used to identify specific types of acoustic degradation. For example, the measured impulse response characteristics are compared with a look-up table of reference impulse response characteristics associated with a particular transducer issue. In an embodiment, a Fast Fourier Transform (FFT) or other transform (e.g., Discrete Cosine Transform (DCT), Short-Time Fourier Transform (STFT)) can be applied to the time domain impulse response to obtain the frequency response. From the frequency response a spectral "signature" (e.g., the energy distribution over a frequency range of interest) can be identified and compared with known spectral signatures associated with particular types of acoustic degradation. Table I summarizes acoustic degradation types that system 100 can detect or not detect.

TABLE I

| Acoustic Degradation Types | |
|---|---|
| Speaker over excursion (ripping) | After the speaker is damaged |
| Speaker coil burnout | After the speaker is damaged |
| Change in speaker compliance due to over excursion | During speaker operation |
| Regular distortion | Yes for high frequency signals (intermodulation distortion). For lower frequency signals the input needs to be compared with the received output |
| Magnet degaussing | Yes |
| Speaker cone pushed in | Yes |
| Phase inversion (due to faulty speaker installation) | Yes - with a specially crafted inaudible signal |
| Speaker is no longer attached to housing | Yes - if the original response is known. |
| Volume behind speaker has shrunk | Yes - with quiet acoustic signals that cover enough of the frequency spectrum |
| Volume behind speaker now has a hole in it | Yes- with quiet acoustic signals that are still audible |
| Loose component in housing causing a rattle | Yes |
| Ground loop | No |
| Microphone is broken | Yes |
| Microphone cover is clogged | Yes |
| Speaker grill is clogged | Yes |
| Radio interference | No |
| Incorrect biasing of microphone | Yes |
| Speaker brownouts (clipping of amplifier) | Yes - not due to the inaudible signal will affect all frequencies |
| Speaker buzzing | Yes |

System 100 described above detects non-intrusively different types of acoustic degradation due to transducer health without playing an audible test tone and without taking the audio system out of operation for servicing. System 100, however, cannot determine which transducer is degraded. In systems that have multiple transducers, such as speaker arrays and microphone arrays in a video conferencing system or cinema application, the specific transducer in a signal path can be identified, as described more fully in reference to FIGS. 2 and 3.

Figure 2:
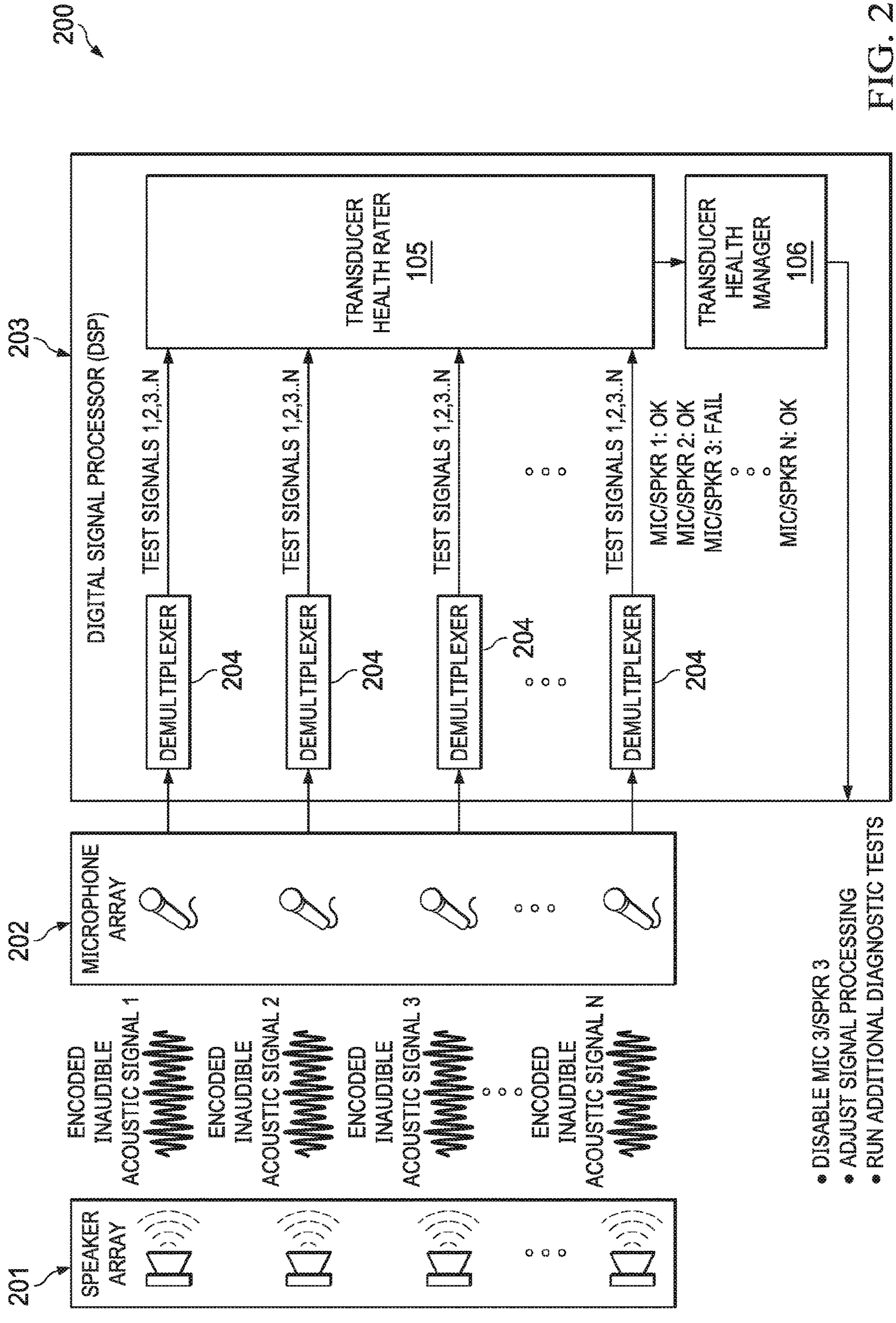
FIG. 2 is a block diagram of signal processing performed by the signal identifier shown in FIG. 1, according to an embodiment.

FIG. 2 is a block diagram providing further detail of the signal processing performed by system 100 shown in FIG. 1, according to an embodiment. In the example embodiment shown, speaker array 201 includes a plurality of loudspeakers that emit inaudible acoustic signals 1 . . . n into the channel (acoustic transmission medium), as described in reference to FIG. 1. In an embodiment, frequency division multiplexing (FDM) is used to transmit the inaudible acoustic signals 1 . . . n.

Microphone array 202 includes a plurality of microphones. Each microphone in microphone array 202 captures the inaudible acoustic signals 1 . . . n emitted by the speakers in speaker array 201. In an embodiment, an analog front end (AFE) is included in the signal paths (not shown) that includes a microphone interface (e.g., an XLR port), an amplifier for amplifying the microphone output signals and an analog-to-digital converter (ADC) for converting the amplified microphone output signals to digital values for input into DSP 203.

DSP 203 includes demultiplexers 204 for demultiplexing the microphone output signals to recover recovered test signals (recovered versions of the test signals). Demultiplexers 204 can include time division demultiplexers, demodulators and/or decorrelators depending on the format of the received signals.

Note that FIG. 2 shows an example use case where multiple encoded inaudible acoustic signals are output from speaker array 201 in parallel. In other embodiments, the inaudible acoustic signals are output through one speaker at a time. Similarly, each microphone in microphone array 202 can be activated one at a time to capture the activated speaker output. In this manner, all possible signal paths through all possible speaker/microphone pairings can be analyzed serially. In an embodiment where inaudible acoustic signals are transmitted in parallel, DSP 203 decorrelates or demuxes the received signals to recover the test signals.

As will be described later in reference to FIG. 3, each loudspeaker/microphone pair plus channel has a unique impulse response, which will change if one or both of the loudspeaker or microphone are degraded. An MLS is used to measure the impulse response of the loudspeaker/microphone pair. To facilitate comparison between loudspeaker/microphone pairs, a SNR of each impulse response is calculated and used to determine outlier SNRs that include one or more degraded transducers. The overall impulse response of each speaker/microphone pair will also include the channel or "room impulse response." However, since the speaker/microphone pairs will experience the same "room impulse response" and the SNRs are being compared with each, the "room impulse response" will not impact the health detection capability of the system.

The recovered test signals are input into transducer health rater 105, which computes the impulse responses for the loudspeaker and microphone pairs using the recovered test signals and original test signals. For MLS test signals, circular cross-correlation or other known technique can be used to measure the impulse response of the loudspeaker/microphone pairs using the recovered MLS (recovered test signal) and original MLS (test signal) used to encode the inaudible signal.

Transducer health rater 105 also computes a SNR for each impulse response. The SNRs are compared to a threshold value to detect outlier SNRs. In an embodiment, a mean of the SNRs is computed, and each SNR is compared to the mean to detect outlier SNRs based on a standard deviation or interquartile range metric. For example, a SNR with a standard deviation greater than 3σ is an outlier SNR, and the loudspeaker/microphone pair associated with the outlier SNR is assumed to be degraded.

As described above, transducer health manager 106 initiates one or more actions in response to the health ratings from transducer health rater 105, such as initiating the disabling of transducers, changing the signal path or adjusting the processing of the audio signal (e.g., adjusting rendering of multichannel audio), and/or initiating further diagnostic tests of transducers (e.g., a sweep sine test, manual test steps).

Figure 3:
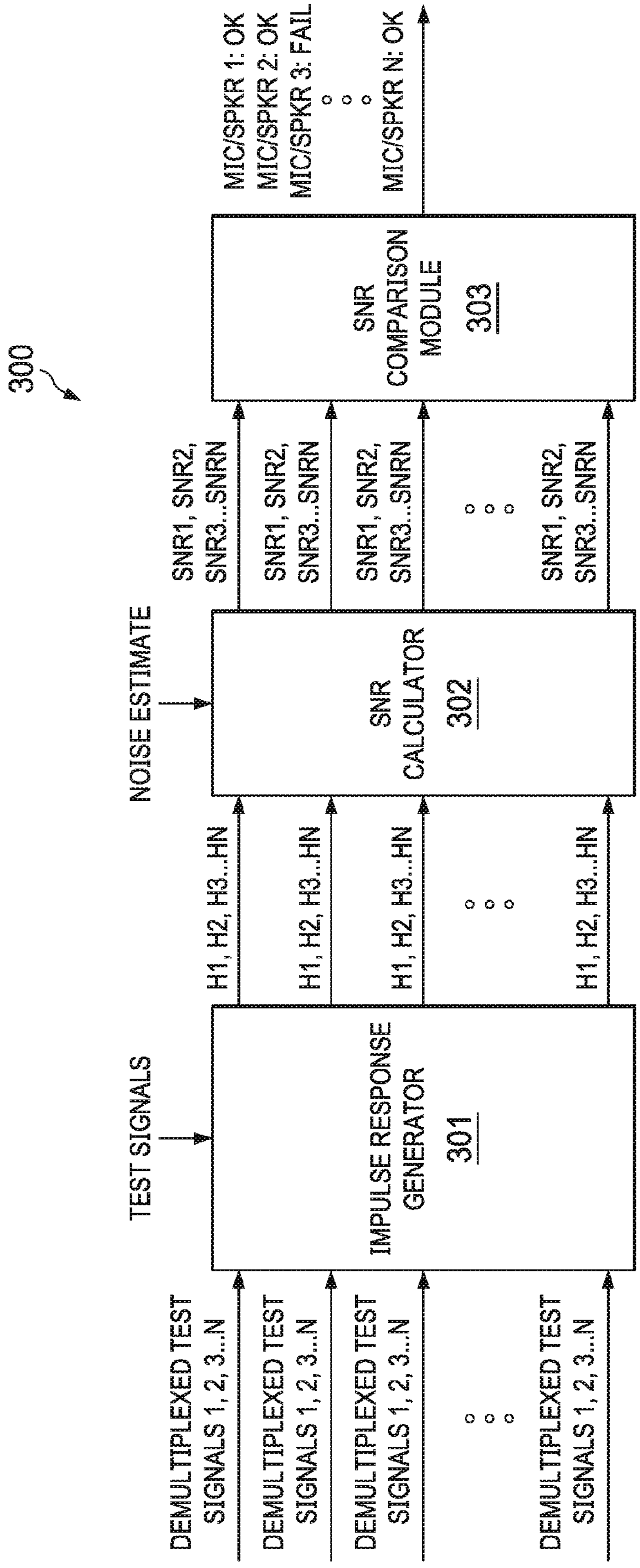
FIG. 3 is a block diagram of signal processing performed by the transducer health rater shown in FIGS. 1 and 2, according to an embodiment.

FIG. 3 is a block diagram of the signal processing performed by the transducer health rater 105 shown in FIG. 1, according to an embodiment. In the example shown, system 300 includes impulse response generator 301, SNR calculator 302 and SNR comparison module 303. The demultiplexed test signals and original test signals are input into impulse generator 301, which generates impulse responses H1 . . . Hn. If the baseband signals are MLSs, the circular cross-correlation or other known technique can be used to measure the impulse responses of the loudspeaker/microphone pair. The impulse responses, H1 . . . Hn, are input into SNR calculator 302 which computes the SNRs for the impulse responses. In an embodiment, the SNR can be calculated as 10 times the log base 10 of the root-mean-square (RMS) of the impulse response H(k) divided by the RMS of sampled noise n(k), where k is an index having an integer value from 1 to N. In an embodiment, the noise n(k) is captured from the ambient environment using one or more of the plurality of microphones when the loudspeakers are not emitting any sound. SNR comparison module 303 compares the SNRs by computing the mean and standard deviation of the SNRs, and identifies SNRs that exceed a specified standard deviation (e.g., 3 sigma) as outlier SNRs.

In the example shown, the microphone/speaker pair 3 has a standard deviation that exceeds a specified standard deviation and is identified as an outlier SNR. SNR comparison module 303 outputs a report of transducer health to transducer health manager 106 (FIG. 2) indicating that microphone/speaker pair 3 has failed, so that transducer health manager 106 can perform a corrective action. Some examples of corrective action include but are not limited to: disabling the speaker and/or microphone; replacing the failed speaker/microphone with a different speaker or microphone; adjusting the signal processing of the audio signal; and/or performing an additional diagnostic test, such as generating a linear or exponential swept sine signal and comparing the resulting frequency response to known frequency responses indicative of acoustic degradation types.

In an embodiment, pairwise comparison of SNRs is used to identify whether the loudspeaker, microphone or both are degraded. For example, assume there are two loud speakers and two microphones in the audio system. Table II illustrates the identification of the degraded transducer by pairwise comparison.

TABLE II

Degraded Transducer Identification Example

| Loudspeaker # | Microphone # | SNR |
|---|---|---|
| Loudspeaker_1 | Microphone_1 | Not Attenuated |
| Loudspeaker_1 | **Microphone_2** | **Attenuated** |
| Loudspeaker_2 | Microphone_1 | Not Attenuated |
| Loudspeaker_2 | **Microphone_2** | **Attenuated** |

As show in Table II above, Microphone_2 is the common transducer when attenuation was observed (indicated by bold type). In this example, Microphone_2 is disabled, and/or the signal processing on the audio signal is adjusted and/or additional diagnostic testing is initiated on Microphone_2, such as playing a linear or exponential swept sine signal and analyzing the resulting frequency response.

In an embodiment, transducer health manager 106 generates control signals and/or data to disable degraded transducers. For example, one or more control signals are sent to an electronic or mechanical switch or relay that connects/disconnects the loudspeaker or microphone from the audio amplifier. In an embodiment, one or more control signals are sent to one or more digital signal processors to adjust the signal processing of the audio signal, such as adjusting orchestrated audio protocols; adjusting audio object rendering or rerouting audio to different speakers in a multichannel audio system; adjusting microphone beamforming (e.g., disabling one microphone in a microphone array to produce mono audio using the remaining "good" microphone); providing graceful degradation in a multichannel audio system to allow continued use of the multichannel audio system; or providing a trigger for an audible stimulus to deliver a better diagnostic result (e.g., linear or exponential swept sine technique).

Example Process

Figure 4:
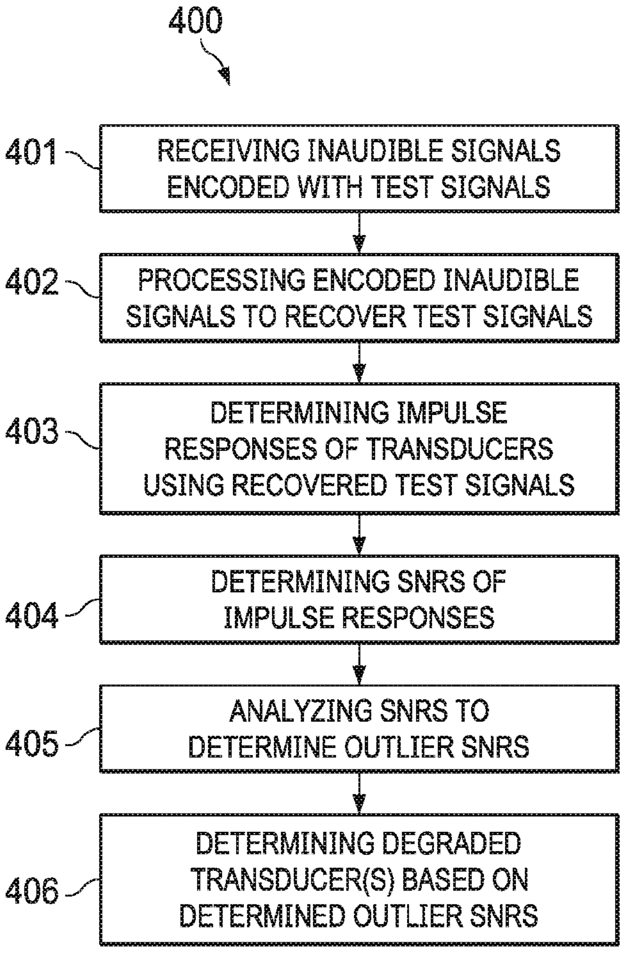
FIG. 4 is a flow diagram of a process of non-intrusive transducer health detection, according to an embodiment.

FIG. 4 is a flow diagram of a process 400 of non-intrusive transducer health detection, according to an embodiment. Process 400 can be implemented using the audio system architecture shown in FIG. 5.

Process 400 begins by receiving encoded inaudible signals for use in transducer health detection (401). In an embodiments where multiple loudspeakers and/or microphones are employed, a different test signal can be used for each loudspeaker. Each inaudible signal is generated (e.g., encoded/modulated) with a different test signal (e.g., a different MLS) using any known encoding or modulation scheme (e.g., ASK, FSK, PSK, QAM, BPSK). In an embodiment, the encoded inaudible signals are transmitted into the acoustic transmission medium using frequency division multiplexing (FDM). The inaudible signals can be ultrasonic signals, sub sonic signals or quiet signals with low SPL levels.

Process 400 continues by demultiplexing the encoded inaudible signals to provide recovered versions of the test signals (402). For example, one or more microphones capture the inaudible signals and an optional AFE applies signal conditioning (e.g., filtering, amplification, analog-to-digital conversion) to the inaudible signals to recover the test signals (e.g., recover the MLS from each inaudible signal). In embodiments with multiple loudspeakers that output encoded inaudible signals in parallel, the encoded inaudible signals are decorrelated by a DSP so they can be processed separately.

Process 400 continues by determining impulse responses of transducer pairs using the recovered test signals and original test signals (403). After demultiplexing/decorrelation, each test signal is associated with a transducer pair (loudspeaker plus microphone). If the test signal is an MLS, the impulse response of the combination of the loudspeaker, channel and microphone is determined using circular cross-correlation or other suitable technique.

Process 400 continues by determining SNRs of the impulse responses (404). For example, a noise sample can be captured from the local ambient environment by the microphones when the inaudible signals are not present. In an embodiment, a constant value can be used for the noise if assumed to be stationary and white. In an embodiment, the SNR is the 10 times log base 10 of the RMS of the impulse response divided by the RMS of the noise sample.

Process 400 continues by analyzing the SNRs to determine outlier SNRs (405). In an embodiment, a mean and standard deviation is computed for the SNRs and outlier SNRs are determined based on the standard deviation. In an embodiment, a SNR that is more than 1.5 interquartile ranges (IQRs) below the first quartile or above the third quartile is an outlier. Other methods for determining outlier SNRs can also be used, such as machine learning (e.g., k-mean clustering, neural networks).

Process 400 continues by determining degraded transducer(s) based on determined outlier SNRs (406).

Example Audio System Architecture

Figure 5:
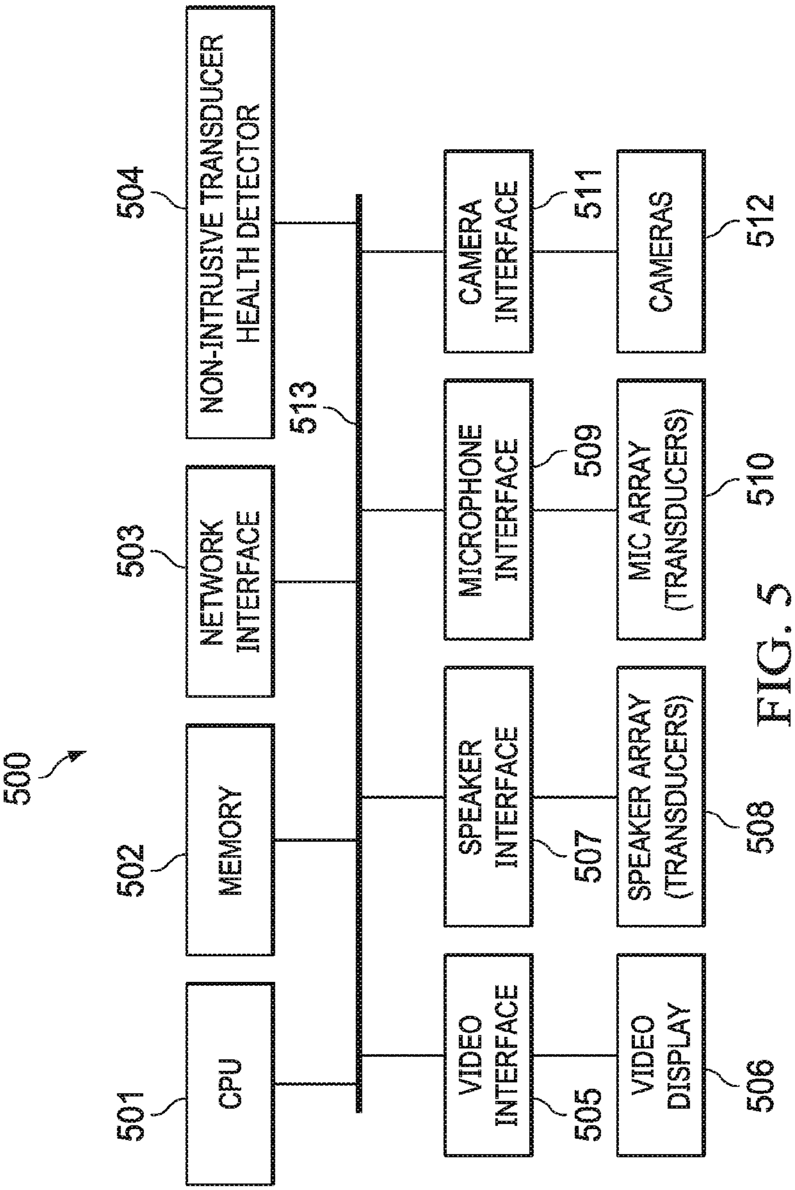
FIG. 5 is a block diagram of an audio system architecture that includes non-intrusive transducer health detection, according to an embodiment.

FIG. 5 is a block diagram of an audio system architecture 500 that includes non-intrusive transducer health detection, according to an embodiment. In this example, audio system architecture 500 is for a video conferencing system that includes central processing unit (CPU) 501 for executing instructions to perform various tasks, memory 502 for storing the instructions and data (e.g., flash memory, RAM, ROM), network interface 503 for connecting to a network, non-intrusive transducer health detector 504 for automatically monitoring the health status of transducers (speakers and microphones), as described in reference to FIGS. 1-4, video interface 505 coupled to video display 506 for displaying video of the participants, speaker interface coupled to speaker array 508 for outputting speech of the participants, microphone interface 509 coupled to microphone array 510 for capturing speech of the participants and camera interface 511 coupled to cameras 512 for capturing video of the participants. Each of these components are coupled to, and communicate with each other, on one or more busses 513. Interfaces 505, 507, 509 and 511 each include circuitry for signal conditioning, such as filters, amplifiers, power supplies, data buffers, clocks and any other circuitry needed for interfacing with its respective input or output device.

Other audio systems that could implement non-intrusive transducer health detection include but are not limited to audio systems used in cinema, smart speakers and any other audio system that includes at least one transducer.

Various aspects of the present invention may be appreciated from the following enumerated example embodiments (EEEs):

EEE 1. A method performed by an audio system, comprising:

outputting, using a first transducer of the audio system, an encoded inaudible signal into an acoustic transmission medium;

receiving, using a second transducer of the audio system, the encoded inaudible signal from the acoustic transmission medium; and using the received encoded inaudible signal to identify a failure or degradation of at least one of the first or second transducer.

EEE 2. The method of EEE 1, wherein the received inaudible signal is an ultrasonic signal.

EEE 3. The method of any of the preceding EEEs 1-2, wherein the received inaudible signal is encoded using a pseudo-random binary sequence.

EEE 4. The method of EEE 3, wherein the pseudo-random binary sequence is a maximum length sequence.

EEE 5. The method of any of the preceding EEEs 1-4, wherein the first transducer is a loudspeaker and the second transducer is a microphone.

EEE 6. The method of any of the preceding EEEs 1-5, wherein using the received encoded inaudible signal to identify failure or degradation of at least one of the first or second transducer includes using the inaudible encoded signal to measure an impulse response of the audio system, and identifying the failure or degradation of at least one of the first or second transducer using the impulse response.

EEE 7. The method of EEE 6, wherein using the received encoded inaudible signal to identify the failure or degradation of at least one of the first or second transducer includes determining a signal-to-noise ratio (SNR) of the impulse response and identifying a change in the SNR.

EEE 8. The method of any of the preceding EEEs 1-7, further comprising:

in accordance with identifying the failure or degradation of at least one of the first or second transducer, initiating, by the audio system, at least one of disabling the at least one of the first or second transducer, adjusting input or output signal processing of at least one of the first or second transducer or initiating one or more additional diagnostic tests on at least one of the first or second transducer.

EEE 9. The method of any of the preceding EEEs 1-8, wherein the audio system includes a first plurality of transducers and a second plurality of transducers, the method further comprising:

outputting, using the first plurality of transducers of the audio system, a plurality of encoded inaudible signals into the acoustic transmission medium, each encoded inaudible signal having a different encoding;

receiving, using the second plurality of transducers of the audio system, the plurality of encoded inaudible signals from the acoustic transmission medium; and using the received plurality of encoded inaudible signals to identify a failure or degradation of at least one transducer of the first or second plurality of transducers.

EEE 10. The method of EEE 9, wherein using the received plurality of encoded inaudible signals to identify the failure or degradation of at least one transducer of the first or second plurality of transducers includes measuring impulse responses of the audio system for first and second transducer pairs, and identifying the failure or degradation using the impulse responses.

EEE 11. The method of EEE 10, wherein using the received plurality of encoded inaudible signals to identify the failure or degradation of at least one of the first or second plurality of transducers includes determining signal-to-noise ratios of the impulse responses, comparing the signal-to-noise ratios to determine outlier signal-to-noise ratios, and identifying the failure or degradation of at least one of the first or second transducer using the outlier signal-to-noise ratios.

EEE 12. The method of EEE 11, further comprising:
computing a statistic or metric using the signal-to-noise ratios;
comparing each signal-to-noise ratio with the mean; and
determining the outlier signal-to-noise ratios based on the comparison with the mean.

EEE 13. An audio system comprising:
a first transducer;
a second transducer;
circuitry configured to:
output, using the first transducer, an encoded inaudible signal into an acoustic transmission medium;
receive, using the second transducer, the encoded inaudible signal from the acoustic transmission medium; and
a processor configured to perform any of the preceding EEEs 1-12:

EEE 14. A non-transitory, computer-readable storage medium having instructions stored thereon that when executed by one or more processors of an audio system, cause the one or more processors to perform the methods of any of the preceding EEEs 1-12.

EEE 15. An apparatus comprising:
a first transducer configured to receive an encoded inaudible signal from an acoustic transmission medium, the encoded inaudible signal output by a second transducer; and
a processor configured to:
measure an impulse response of an audio system that includes the first transducer and the second transducer using the received encoded inaudible signal;
identify a failure or degradation of at least one of the first transducer or second transducer based on the impulse response of the audio system; and
initiate at least one of disabling at least one of the first transducer or second transducer, adjusting input or output signal processing of at least one of the first transducer or second transducer or initiating one or more additional diagnostic tests on at least one of the first transducer or second transducer.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method performed by an audio system, comprising:
encoding a test signal on an inaudible acoustic signal;
outputting, using a first transducer of the audio system, the encoded inaudible acoustic signal into an acoustic transmission medium;
receiving, using a second transducer of the audio system, the encoded inaudible acoustic signal from the acoustic transmission medium;
recovering a recovered test signal from the received encoded inaudible acoustic signal;
using the recovered test signal to identify a failure or degradation of at least one of the first or second transducer, wherein using the recovered test signal to identify a failure or degradation further includes:
determining an impulse response of the audio system based on the recovered test signal and the test signal;
determining background noise of the acoustic transmission medium;
determining, based on the impulse response and background noise, a signal-to-noise ratio (SNR); and
identifying a failure or degradation of the at least one of the first or second transducer based on the SNR.

2. The method of claim 1, wherein the received inaudible signal is an ultrasonic signal.

3. The method of claim 1, wherein the received inaudible signal is encoded using a pseudo-random binary sequence.

4. The method of claim 3, wherein the pseudo-random binary sequence is a maximum length sequence.

5. The method of claim 1, wherein the first transducer is a loudspeaker and the second transducer is a microphone.

6. The method of claim 1, wherein using the recovered test signal to identify a failure or degradation further includes determining a change in the SNR.

7. The method of claim 1, further comprising:
in response to identifying a failure or degradation of at least one of the first or second transducer, performing, by the audio system, at least one of:
disabling the at least one of the first or second transducer,
adjusting input or output signal processing of at least one of the first or second transducer, or
performing one or more additional diagnostic tests on at least one of the first or second transducer.

8. The method of claim 1, wherein the audio system includes a first plurality of transducers and a second plurality of transducers, the method further comprising:
outputting, using the first plurality of transducers of the audio system, a plurality of encoded inaudible signals into the acoustic transmission medium, each encoded inaudible signal having a different encoding;
receiving, using the second plurality of transducers of the audio system, the plurality of encoded inaudible signals from the acoustic transmission medium;
using the received plurality of encoded inaudible signals to identify a failure or degradation of at least one transducer of the first or second plurality of transducers, wherein using the received plurality of encoded inaudible signals to identify the failure or degradation of at least one transducer of the first or second plurality of transducers includes:
measuring impulse responses of the audio system for first and second transducer pairs;
determining signal-to-noise ratios of the impulse responses, comparing the signal-to-noise ratios to determine outlier signal-to-noise ratios, and identifying the failure or degradation of the at least one transducer of the first or second plurality of transducers using the outlier signal-to-noise ratios.

9. The method of claim 8, further comprising:

computing a statistic or metric using the SNR ratios;

comparing each SNR ratio with the mean; and determining the outlier SNRs ratios based on the comparison with the mean.

10. A non-transitory, computer-readable storage medium having instructions stored thereon that when executed by one or more processors of an audio system, cause the one or more processors to perform the methods of claim 1.

11. An audio system comprising:

a first transducer;

a second transducer;

circuitry configured to:

encode a test signal on an inaudible acoustic signal;

output, using the first transducer, the encoded inaudible signal into an acoustic transmission medium;

receive, using the second transducer, the encoded inaudible signal from the acoustic transmission medium; and a processor configured to:

recover a recovered test signal from the received encoded inaudible acoustic signal;

use the recovered test signal to identify a failure or degradation of at least one of the first or second transducer, wherein using the recovered test signal to identify a failure or degradation of the at least one of the first or second transducer includes:

determining an impulse response of the audio system based on the recovered test signal and the test signal;

determining background noise of the acoustic transmission medium;

determining, based on the impulse response and background noise, a signal-to-noise ratio (SNR); and identifying a failure or degradation of the at least one of the first or second transducer based on the SNR.

12. The audio system of claim 11, further including circuitry configured to, in response to identifying a failure or degradation of at least one of the first or second transducer, initiate at least one of:

disabling the at least one of the first or second transducer, adjusting input or output signal processing of at least one of the first or second transducer, or performing one or more additional diagnostic tests on at least one of the first or second transducer.

* * * * *